United States Patent
Fox et al.

(10) Patent No.: US 7,324,064 B2
(45) Date of Patent: *Jan. 29, 2008

(54) PASSIVE ANTI-JAMMING ANTENNA SYSTEM

(75) Inventors: Cordell Fox, Byron, GA (US); Kevin Wing, Byron, GA (US); Robert A. Murphy, Tucson, AZ (US); David C. Priester, Gray, GA (US)

(73) Assignee: Science Applications International Corporation, San Diego, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 11/242,927

(22) Filed: Oct. 5, 2005
(Under 37 CFR 1.47)

(65) Prior Publication Data
US 2007/0229390 A1 Oct. 4, 2007

Related U.S. Application Data

(63) Continuation of application No. 10/234,098, filed on Sep. 5, 2002, now Pat. No. 6,992,643, which is a continuation of application No. 09/774,085, filed on Jan. 31, 2001, now Pat. No. 6,469,667.

(60) Provisional application No. 60/179,564, filed on Feb. 1, 2000.

(51) Int. Cl.
H01Q 15/02 (2006.01)
H01Q 13/00 (2006.01)
(52) U.S. Cl. ................... 343/909; 343/782; 343/910; 343/700 MS

(58) Field of Classification Search ............... None
See application file for complete search history.

(56) References Cited

U.S. PATENT DOCUMENTS

| | | | |
|---|---|---|---|
| 4,164,718 A | 8/1979 | Iwasaki | 333/81 R |
| 4,673,943 A | 6/1987 | Hannan | 342/367 |
| 4,837,581 A | 6/1989 | Hansen et al. | 343/703 |
| 4,903,326 A | 2/1990 | Zakman et al. | 455/575.7 |
| 5,113,190 A | 5/1992 | Klein | 342/4 |
| 5,202,701 A | 4/1993 | Casey | 343/909 |
| 5,208,599 A | 5/1993 | Rudduck et al. | 342/4 |
| 5,357,260 A | 10/1994 | Roederer et al. | 343/754 |
| 5,617,095 A | 4/1997 | Kim et al. | 342/1 |
| 5,666,125 A | 9/1997 | Luxon et al. | 343/702 |
| 5,710,564 A | 1/1998 | Nimtz et al. | 342/1 |

(Continued)

OTHER PUBLICATIONS

International Search Report on Application No. PCT/US01/03071, dated Apr. 9, 2001 (mailing date).

(Continued)

*Primary Examiner*—Trinh Vo Dinh
(74) *Attorney, Agent, or Firm*—King & Spalding LLP

(57) ABSTRACT

System and method for improving the interference resistance of an radio frequency (RF) antenna system through passive prescreening of the RF energy incident upon the antenna. The invention physically partitions the RF environment into two or more sectors with respect to the direction of arrival of incident energy. The power level of the RF frequencies of interest incident upon each sector is determined such that whenever the power level exceeds a given threshold, the received signal from energy incident on that sector is modified.

14 Claims, 8 Drawing Sheets

U.S. PATENT DOCUMENTS

| | | | |
|---|---|---|---|
| 5,844,518 A | 12/1998 | Berg et al. | 342/2 |
| 6,023,203 A | 2/2000 | Parish | 333/126 |
| 6,181,290 B1 | 1/2001 | Zaitsev et al. | 343/786 |
| 6,184,841 B1 | 2/2001 | Shober et al. | 343/853 |
| 6,295,032 B1 | 9/2001 | Podgorski | 343/703 |
| 6,469,667 B2 | 10/2002 | Fox et al. | 343/700 MS |
| 6,992,643 B2 * | 1/2006 | Fox et al. | 343/909 |

OTHER PUBLICATIONS

Preliminary Examination Report for Application No. PCT/US01/03071, dated Aug. 20, 2001 (mailing date).

* cited by examiner

TOP VIEW

SECTION VIEW

PASSIVE ANTI-JAMMING ANTENNA SYSTEM

CROSS-REFERENCE TO RELATED APPLICATIONS

This application is a continuation of application Ser. No. 10/234,098, filed Sep. 5, 2002 now U.S. Pat. No. 6,992,643, which is a continuation of application Ser. No. 09/774,085, filed Jan. 31, 2001, now U.S. Pat. No. 6,469,667. Each and every document, including patents and publications, cited herein is incorporated herein by reference in its entirety as though recited in full.

This application is related to and claims the benefit of U.S. Provisional Application No. 60/179,564 entitled "Passive Anti-Jamming Antenna System." filed 1 Feb. 2000, hereby incorporated herein in its entirety.

FIELD OF THE INVENTION

The present invention relates to the field of antenna systems, and more particularly, to passive interference-suppressing antenna systems, and the methods used therein.

BACKGROUND OF THE INVENTION

Radio Frequency (RF) jamming, i.e. intentional RF interference, occurs when RF power is transmitted so as to interfere with the reception and interpretation of an RF receiving system. Jamming signals may interfere with the operation of receivers such as navigation, communication, and global positioning system (GPS) receivers. In this sense electromagnetic interference generally, and jamming in particular, are considered countermeasures to the intended utilization of RF receiver systems.

A number of techniques have been developed to mitigate the deleterious effects of interference on RF receiver systems, including employment of adaptive antenna systems. Adaptive antenna systems typically measure the received power and/or the signal or carrier to noise ratio. These measurements are utilized to modify the reception pattern of the receiving antenna in order to steer a null, i.e., a minimal reception region, in the direction of a interference source and/or steer a gain maximum in the direction of a desired information signal source.

One example of such an adaptive antenna system counter-countermeasure is referred to as the Controlled Reception Pattern Antenna (CRPA). The CRPA operates by receiving electromagnetic energy and feeding it into an antenna array controller unit. Upon detection of received interference power above a threshold, the antenna array controller adaptively alters the antenna array's reception pattern to attenuate the gain in the direction of the interference. It does this by applying amplitude and phase weights to the auxiliary elements in the array and repeatedly taking power measurements of the incident interference. If a weight is applied to an element and the received power of the interference (or jamming signal) improves (decreases) the antenna array controller decides that the applied weight was a good choice and the weight is saved. If the received interference power increased, or remained the same, however, the antenna array controller decides that the applied weight was not a good choice and it returns to the previous weight for that element. The Antenna Electronics (AE) unit keeps repeating this process until the received power level has returned to its pre-interference level, which implies that a null has been successfully steered in the direction of the interference.

The GPS Antenna System (GAS) is a next generation adaptive antenna array system that is the follow-on to the CRPA/AE. Beam steering in a GAS is accomplished by maximizing the signal-to-noise, or carrier-to-noise, ratio, which indicates that a maximum in the array's reception has been steered in the direction of the intended signal source. The GAS is believed to operate much faster than the CRPA/AE since it incorporates modern processors.

Both CRPA/AE and GAS adaptive systems have a number of drawbacks. They are limited to mitigating a maximum of 6 interferers and are ineffective against some types of simple jammers as well as some types of advanced jamming waveforms. Also, the nulls produced are relatively wide and these systems require software modifications to deal with changes in jamming technology

SUMMARY OF THE INVENTION

A system and method for receiving transmitted electromagnetic signals in the presence of interference is disclosed. In one embodiment, the present invention improves the interference resistance of an existing RF antenna receiver system by passively prescreening the electromagnetic energy incident upon the antenna. One embodiment includes physically partitioning the incident electromagnetic RF environment of the protected system into two or more fields of view, or sectors, and evaluating the power level of the RF frequencies of interest incident upon each sector. In one embodiment, the passage of the incident frequencies of interest by a sector to the protected receiver system is prevented whenever the power level of any RF frequency of interest exceeds a given threshold. In this way, the present invention passively mitigates the impact of intentional RF jamming and unintentional RF interference. The physical shape of the antenna, the number of sectors into which the RF environment is portioned, the frequencies of interest and the threshold values are specifically tailored to the requirements of the system being protected.

Consequently, embodiments of the present invention eliminate the requirement for an algorithmic determination of an interferer's presence, its location and its subsequent elimination. In some embodiments, it operates in a single step, without the requirement for software. Also, narrow nulls may be constructed and their width may be modified by varying the geometry and the number of individual sectors partitioning the RF environment.

BRIEF DESCRIPTION OF THE FIGURES

The various advantages of the invention will become apparent to one skilled in the art by reading the following specification and by reference to the following drawings, which are provided by way of example and do not limit the broad application of the invention.

DETAILED DESCRIPTION OF THE DRAWINGS

The following description relates to a system and method for improving the interference resistance of an antenna system through passive prescreening of the RF energy incident upon the antenna. Preferred embodiments of the invention physically partition the RF environment into two or more sectors with respect to the direction of arrival of incident energy. In a preferred embodiment, the power level of the RF frequencies of interest incident upon each sector is monitored such that whenever the power level exceeds a threshold, the received signal generated by energy incident upon that sector is filtered, attenuated, or blocked from reaching a downstream device, e.g., a receiver.

Figure 1:
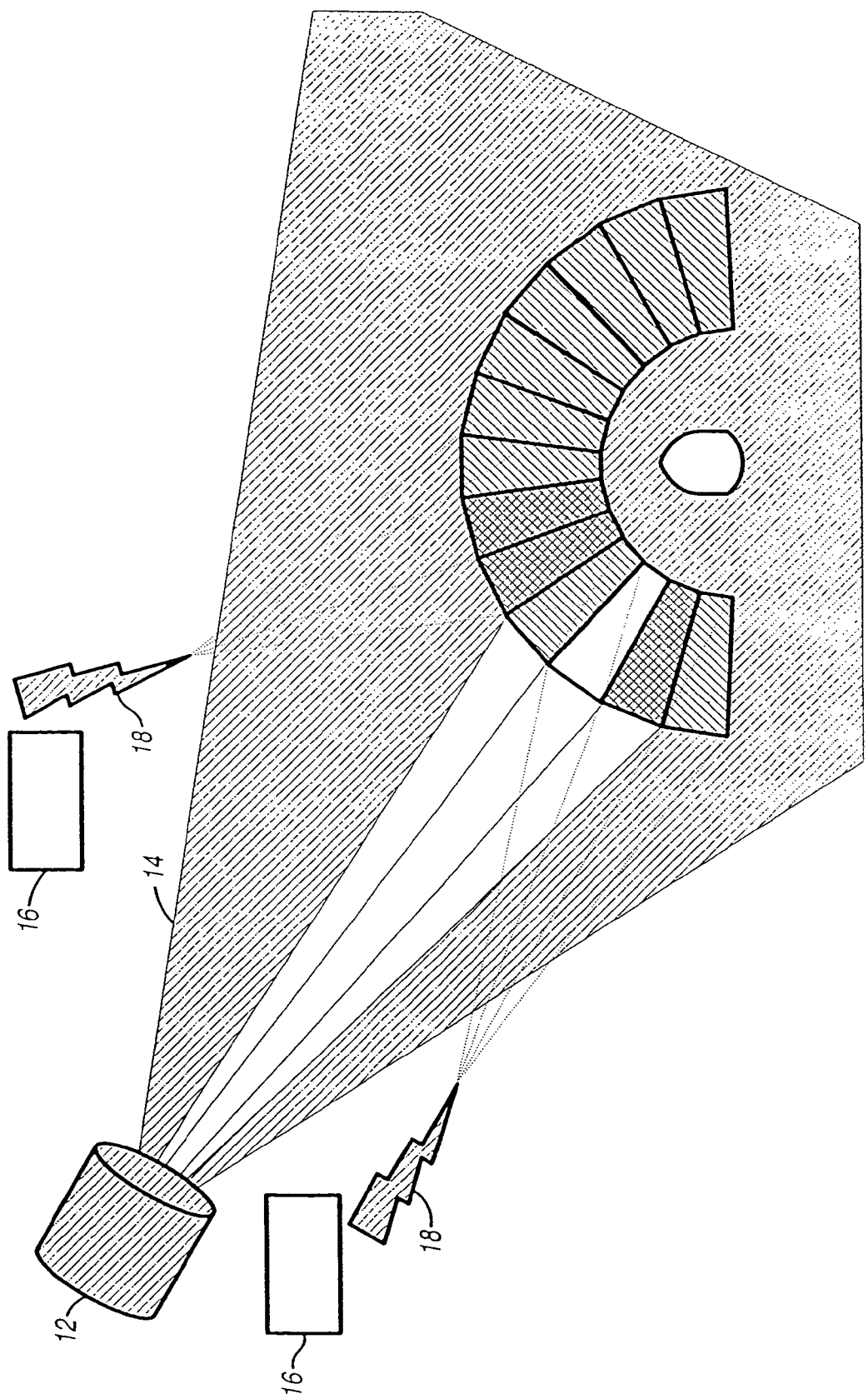
FIG. 1 depicts the RF environment partitioning aspect of the invention for two or more sectors.

Referring to FIG. 1 there is shown a notional diagram of an antenna system 10 of the present invention and the environment in which the antenna system 10 operates. A source of desired RF signals 12 transmits a desired RF signal 14 in the direction of the antenna system 10. The source 12 may comprise a satellite, or other airborne or ground based sources. One or more interference sources 16 generate interference energy 18, which is incident on the antenna system 10. The interference sources 16 may be deliberately placed by a hostile party to interfere with the reception of the desired signal, i.e. jamming, or may derive from other sources, either naturally occurring or man-made. Because the interference energy 18 is often stronger than the desired signal 14, its presence can make detection of the desired signal difficult or impossible. An antenna system of the present invention 10 allows the desired signal 14 to be detected in the presence of the interference energy 18 by effectively isolating a portion of the interference energy.

Figure 2:
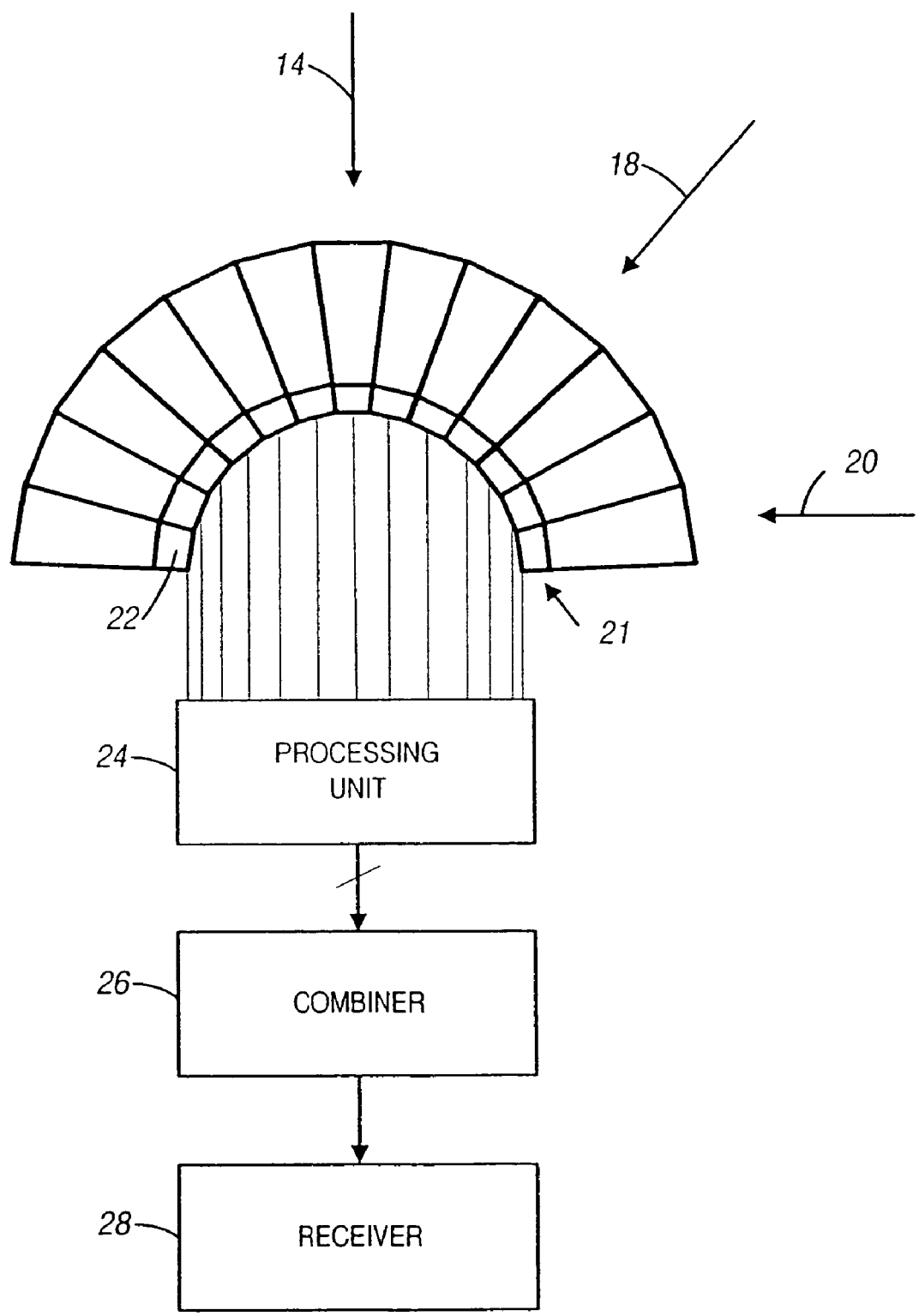
FIG. 2 shows a block diagram of the major functional components of one embodiment of the present invention that utilizes sector-specific antenna elements.

FIG. 2 shows additional details of one embodiment of an antenna system 10 of the present invention. A desired signal 14 and interference energy 18 are received by a partitioning device 20. An antenna array 21 includes two or more antenna elements 22, which are disposed at the base of the partitioning device 20. The partitioning device 20 is configured such that it creates spatial sectors that divide the field of view (FOV) of the antenna system 10 into two or more regions of space. The base of each sector is configured to define the size and shape of the top of the antenna elements 22.

Each antenna element 22 generates a received RF signal in response to the incident energy 14 and 18 as affected by the partitioning device 20. The RF signals generated at each antenna element 22 are communicated to a processing unit 24. The processing unit 24 selectively modifies individual signals from individual antenna elements 22 and either blocks the signal entirely, or communicates a modified, e.g., filtered or attenuated, signal to a combiner unit 26 and then to a receiver 28. The processing unit 24 need not contain active components. Signals from the other antenna elements 22 are unmodified by the processing unit 24 and reach the combiner 26 and receiver 28 substantially unattenuated.

In a preferred embodiment of the invention, the processing unit 24 measures the power of each signal coming from each antenna element 22, and hence from each corresponding sector in the partitioning device 20. If the power level from any sector exceeds a predetermined threshold, the processing unit 24 blocks the energy from that sector from reaching the receiver 28 or attenuates that energy. This is done because signals exceeding the threshold are likely to be from an interferer, and not from the desired signal source. The exact level of the threshold will depend on the specific parameters of the particular antenna system. For example, the threshold should be above the maximum expected signal strength of the desired signal to avoid blocking the desired signal. The processing unit 24 monitors the incoming RF signals from each segment, so that changes in the location and strength of the interference will be readily detected and blocked or attenuated.

Figure 3A:
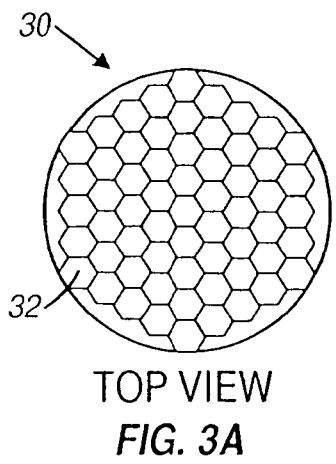
FIG. 3A shows a top view of an antenna having hex-sided sectors in accordance with one embodiment of the invention.
Figure 3B:
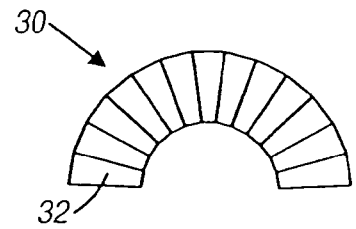
FIG. 3B shows a sectional view of an antenna having hex-sided sectors in accordance with one embodiment of the invention.

FIGS. 3A and 3B show two views of a partitioning device 30 in accordance with a preferred embodiment of the invention. Each sector 32 in the partitioning device 30 has hex shaped walls. Other shapes could be used depending on the requirement of the particular application. FIG. 3B shows that the partitioning device 30 is hemispherical shaped in cross-section. This cross-sectional shape could instead be oval or flat depending on the application.

Figure 4:
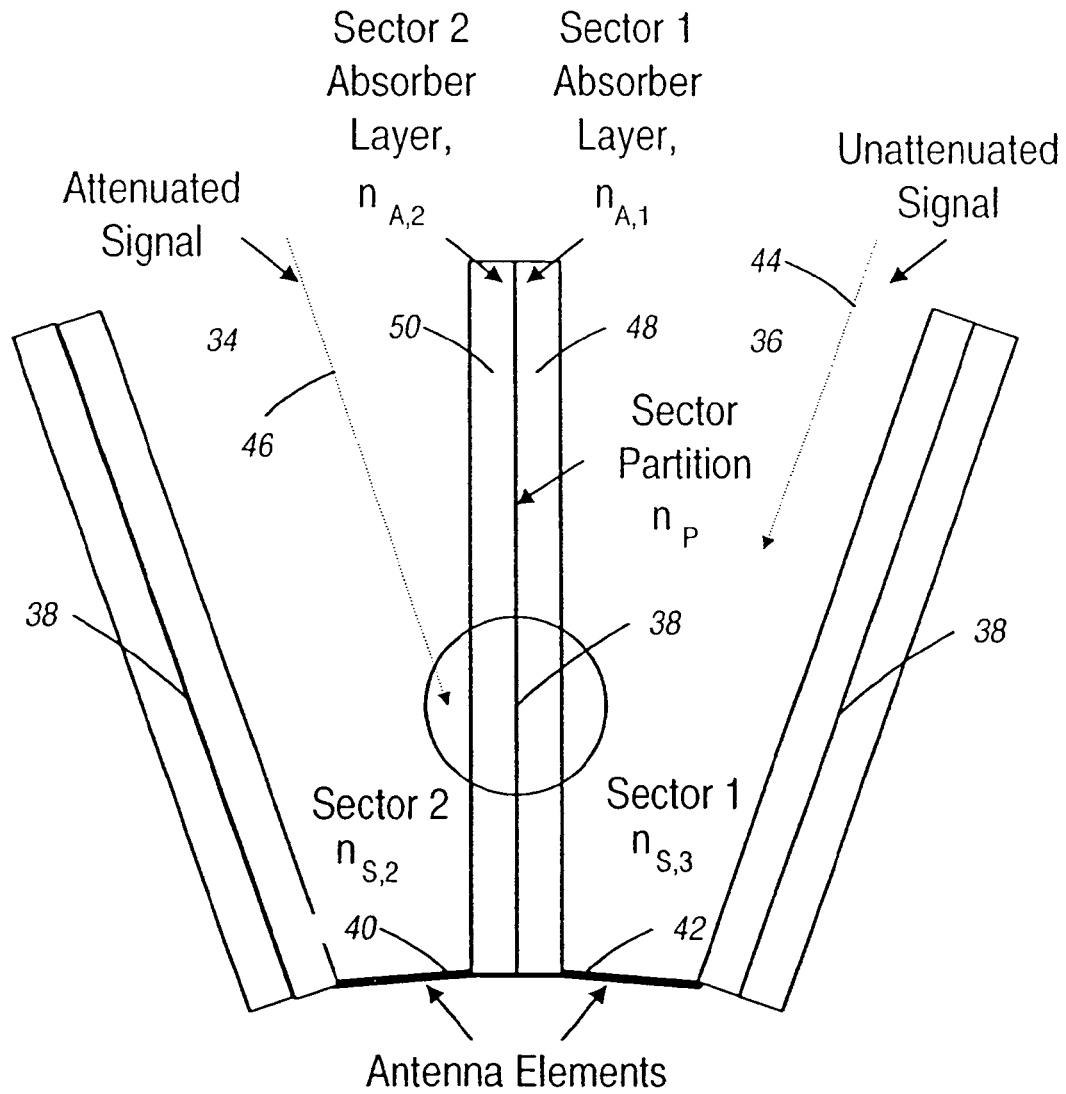
FIG. 4 shows a diagram of two adjacent sectors in an interference mitigation antenna system in accordance with one embodiment of the invention.

FIG. 4 shows an expanded cross-sectional view of two adjacent sectors 34 and 36 which form part of a partitioning device such as the one shown in FIGS. 3A and 3B, in accordance with another embodiment of the invention. The sector walls 38 define the shape of each sector 34 and 36. Antenna elements 40 and 42 are disposed to the base of the sectors 34 and 36 respectively.

A desired RF signal 44 is shown entering sector 36. This sector happens to be positioned such that the desired signal 44 enters the sector 36 and passes unimpeded to the antenna element 42 at its base i.e., the desired signal 44 is "on-axis" to sector 36. Since the desired signal 44 will typically be below threshold, the RF energy incident on the antenna 42, comprising the desired signal, will not be blocked by the processing unit 24 and will reach the receiver 28.

Interference energy 46, will generally be coming from a different direction than the desired signal 44, i.e., an antenna array may be directed such that much interference energy arrives "off-axis" to at least some sectors. There are two primary concerns with such interference energy. First, it is desired that the off-axis interference energy 46 entering sector 36 be absorbed by the sector walls 38 and not reach the antenna element 42 to any significant degree. This will ensure that antenna element 42 will receive only significant levels of the desired signal and little or none of the interference energy. A second concern is to insure that a interference energy 46 in a sector 34 adjacent to a sector receiving the desired signal, does not cross the sector wall 38 and reach that sector. Both of these situations are referred to herein as multipath reception.

FIGS. 4-7 show embodiments of the present invention that suppress multipath reception by the use of absorber layers 48, 50. It will be appreciated that other techniques for suppressing multipath reception may be employed while using the teachings of the invention. In general, the absorber layers absorb off-axis signals 46. As a result, the full strength of these signals 46 does not reach the antenna element 42 receiving a desired signal 44, nor do the signals 46 cross over from an adjacent sector 34 to the sector 36 receiving the desired signal 44. Note that, absent filters of some sort, interfering energy that is on-axis to a sector will be received directly by the antenna element in that sector, its strength will typically be above-threshold, thus the received signal from any element in that sector will be blocked or attenuated by the processing unit 24.

Referring again to FIG. 4, there is shown an off-axis signal 46 that enters the sector 34 adjacent to the sector 36 receiving the desired signal 44. The volume inside sector 34 is filled with a material having an index of refraction designated n(s,2). Likewise, the volume inside sector 36 is filled with a material having an index of refraction of n(s,1). The sector wall 38 is preferably a dielectric (non-conducting) material that has an index of refraction of n(p). These materials may be selected based on the requirements of the particular application.

The sector wall 38 separating sectors 34 and 36 is coated on each side with an absorber layer 48, 50. The absorber layers 48 50 together with the sector wall 38 minimize reflections from spatial regions outside the field-of-view of each individual sector. In particular, the sector wall 38 is coated on the sector 36 side with a first absorber layer 48, having index of refraction n(A,1). The sector wall is coated on the sector 34 side with a second absorber layer 50, having an index of refraction of n(A,2).

Figure 5:
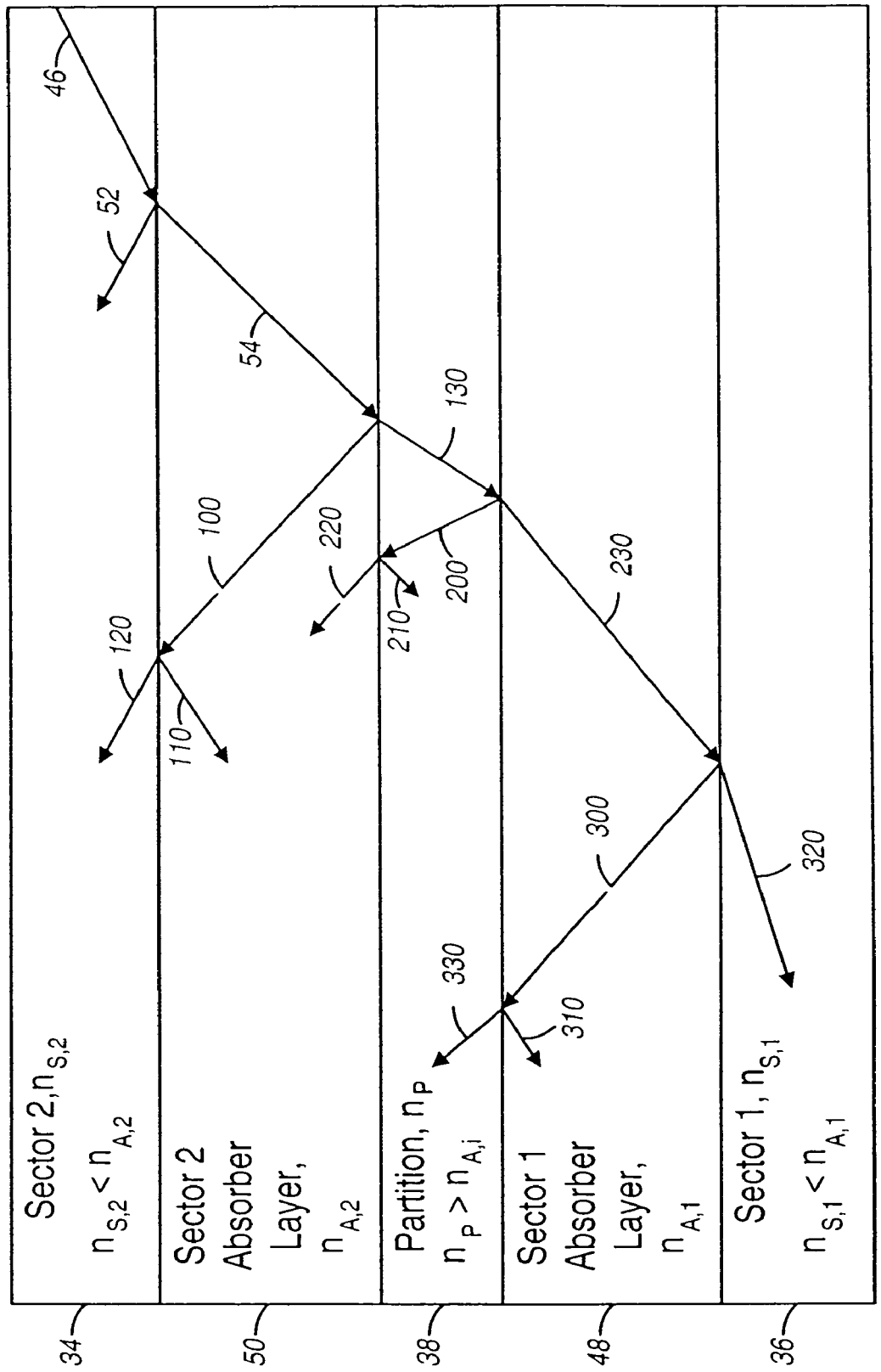
FIG. 5 shows the interaction of an RF wave incident upon an absorber coated partition separating antenna sectors in accordance with one embodiment of the invention.

FIG. 5 shows an enlarged section of the sector wall 38 within the circled area of FIG. 4. The off-axis signal 46 is shown traveling through the volume of sector 34. When signal 46 encounters the absorber layer 50, a reflected wave 52 and a refracted wave 54 are generated. In this example, n(s,i)<n(A,i)<n(p), where i=1 or 2. The strengths of the reflected and transmitted components depend upon the angle of incidence upon the boundary of absorber layer 50, the polarization state of the incident wave, and the relationship between n(s,i) and n(A,i).

The wave 54 transmitted into the absorber 50 propagates until it encounters the boundary between the absorber layer 50 and the partition wall 38. As before, a fraction 100 of this wave is reflected back into the absorber layer 50 and the remainder 130 is transmitted into the partition wall 38. Again, the strengths of these reflected and transmitted components depend upon the angle of incidence upon the boundary, the polarization state of the incident wave, and the relationship between n(A,i) and n(p). As can be seen in FIG. 5, reflected 52, 100, 110, 200, 210, 300, 310 and transmitted 54, 120, 130, 220, 230, 320, 330 wave components are produced each time that a propagation wave encounters a boundary with a different material (different refractive indexes). Consequently, the absorption of off-axis signals can be controlled by the selection of the materials of the partition wall 38, absorber layers 48 and 50, and the material within the sector volume.

Figure 6:
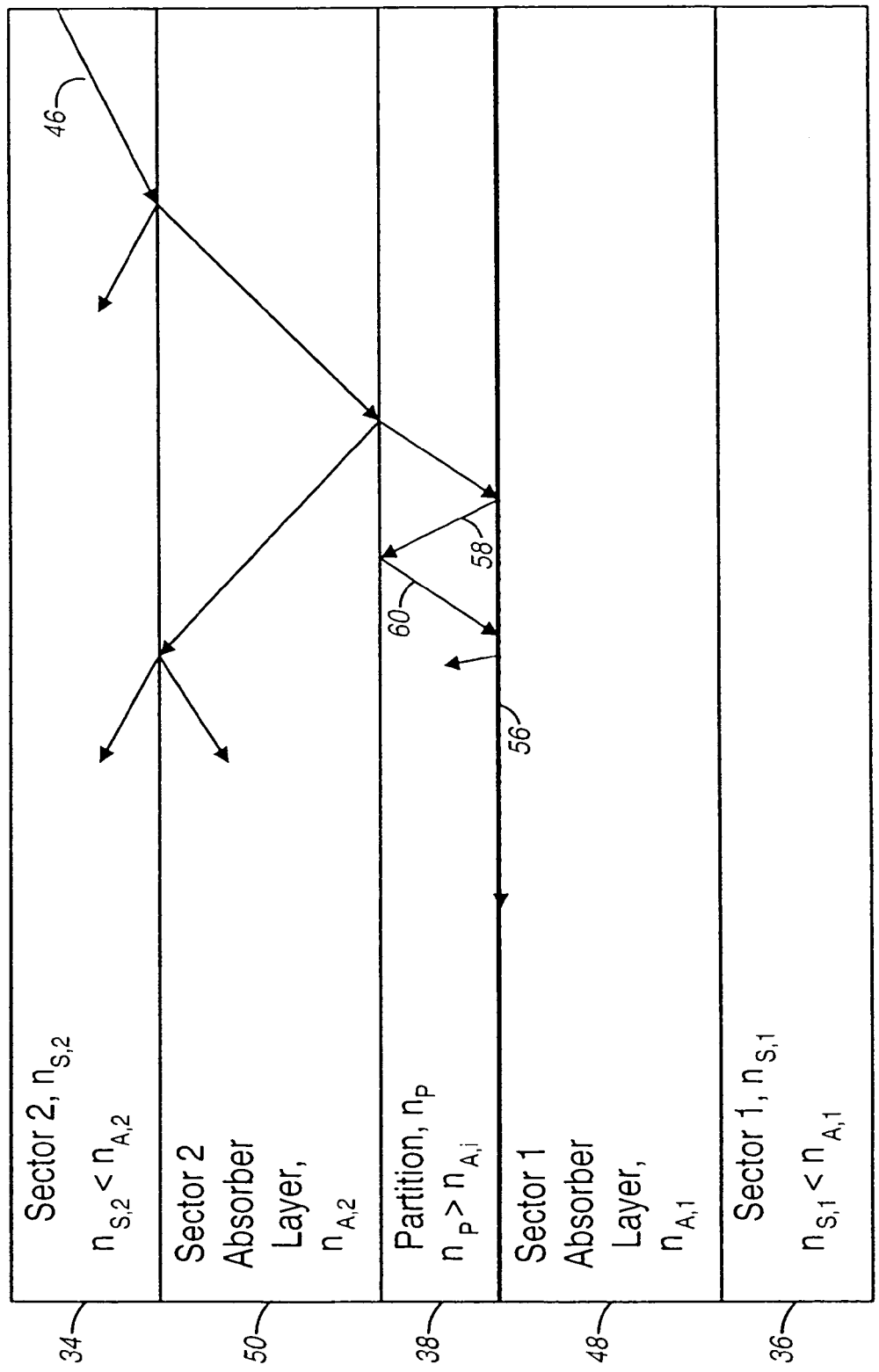
FIG. 6 shows the occurrence of total internal reflection at the boundary between an antenna partition and its absorbent layer.

Further control of the transmission of off-axis signals can be achieved by the use of the phenomenon known as total internal reflection (TIR). FIG. 6 illustrates the use of TIR at the boundary between the sector wall 38 and the absorber layer 48, where, as in FIG. 5, n(s,i)<n(A,i)<n(p) and i=1 or 2. It will be appreciated that when a wave is incident upon a less dense medium (having smaller refractive index), from a more dense medium (having a larger refractive index), the reflectivity is equal to one when the angle of incidence equals an angle called the "critical angle". That is, when the angle of incidence equals the critical angle the transmission angle reaches 90 degrees and the transmitted wave propagates parallel to the boundary between the two materials. This is shown by the dotted line 56 in FIG. 6. When the angle of incidence exceeds the critical angle, the angle of transmission becomes imaginary and the energy is reflected back into the denser medium, as shown by lines 58, 60, etc. Note that since n(p) is greater than both n(A,1) and n(A,2), the wave 58-62 undergoes TIR at both the boundaries of the partition wall 38 material with the two absorber layer materials.

Figure 7:
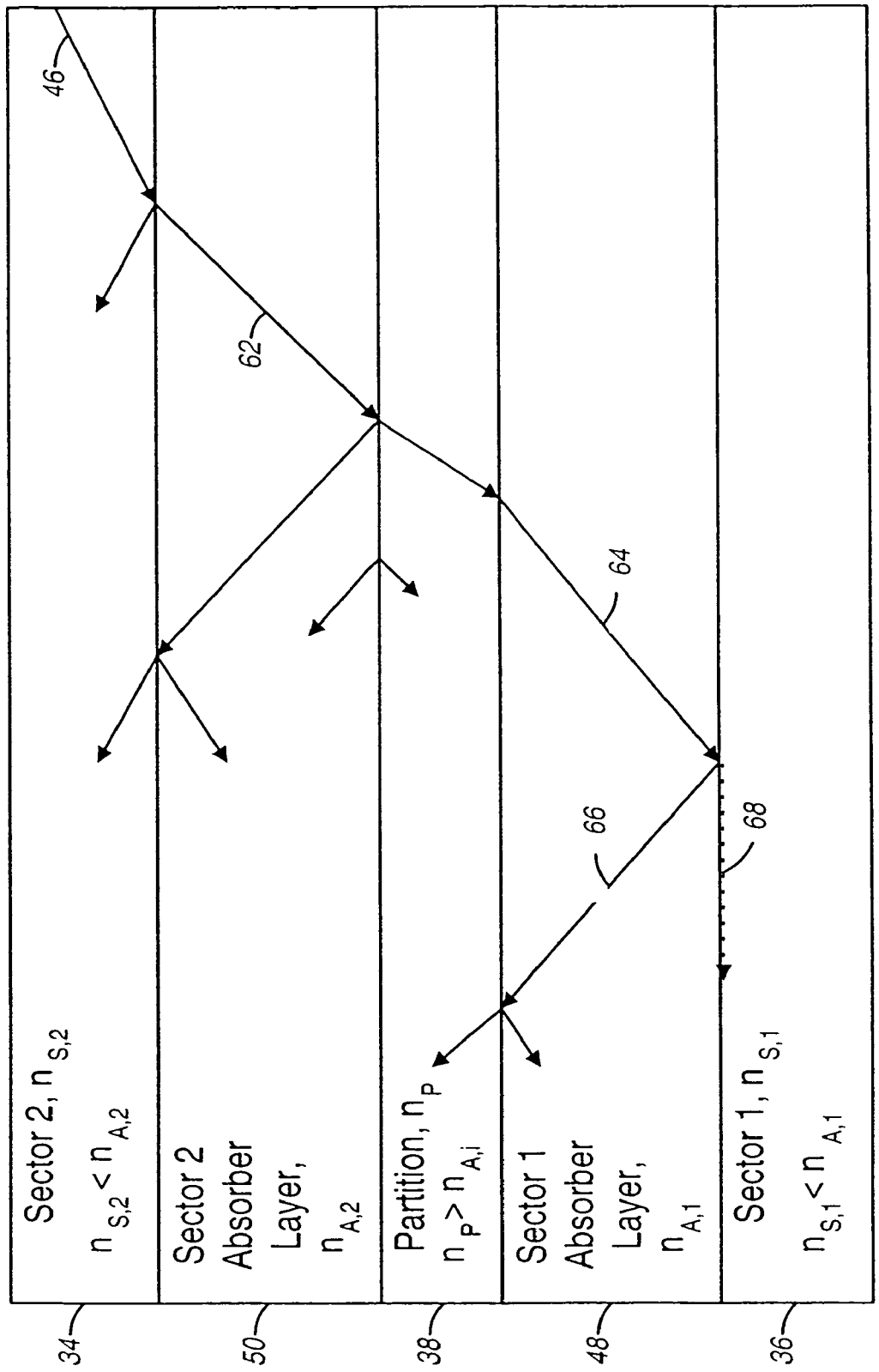
FIG. 7 shows the occurrence of total internal reflection at the boundary between an antenna partition absorbent layer and the interior of a sector.

FIG. 7 also illustrates the use of TIR to control the transmission of the off-axis signal 46. In this case, the angle of incidence of the signal 46 and the indices of refraction of the materials is such that wave 130 does not undergo TIR when it encounters the boundary between the partition wall 38 and the absorber layer 48. However, the angle of incidence of wave 64 at the boundary between the absorber layer 48 and the sector volume 36 is great enough to produce TIR. Wave 68 is generated when the angle of incidence of wave 64 is equal to the critical angle. When incoming waves are at less than the critical angle, there will be some component transmitted into the sector 36. However, the physical dimensions of the partitioning device 20 can be designed such that waves this far off-axis will effectively be prevented from directly entering the sector 34 so that wave 46 will not be transmitted into sector 36.

There are many possible permutations of refractive index relationships other than the conditions depicted above. Hence it can be seen that multipath reception can be controlled by choice of the physical dimensions of the partitioning device, and the materials of the sector volume, the absorbers and the partition wall.

Figure 8:
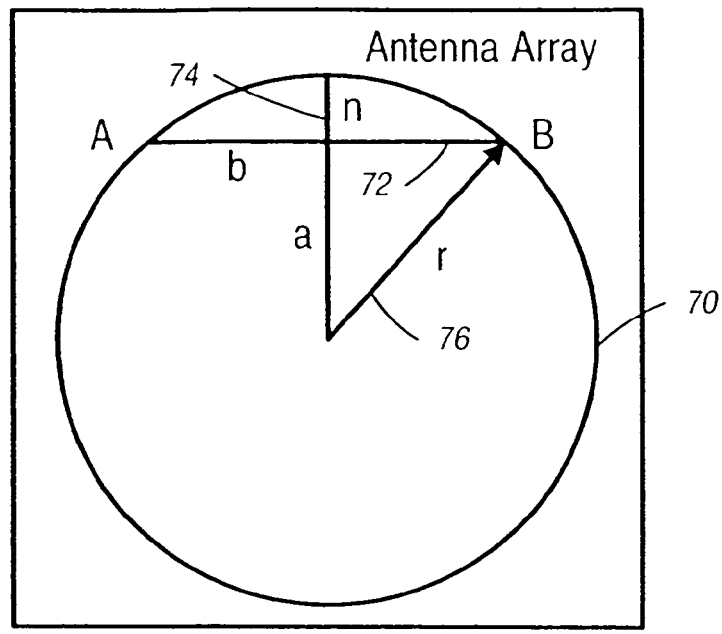
FIG. 8 shows a diagram of the geometry of an antenna array for analyzing antenna sectors' fields of view.
Figure 9:
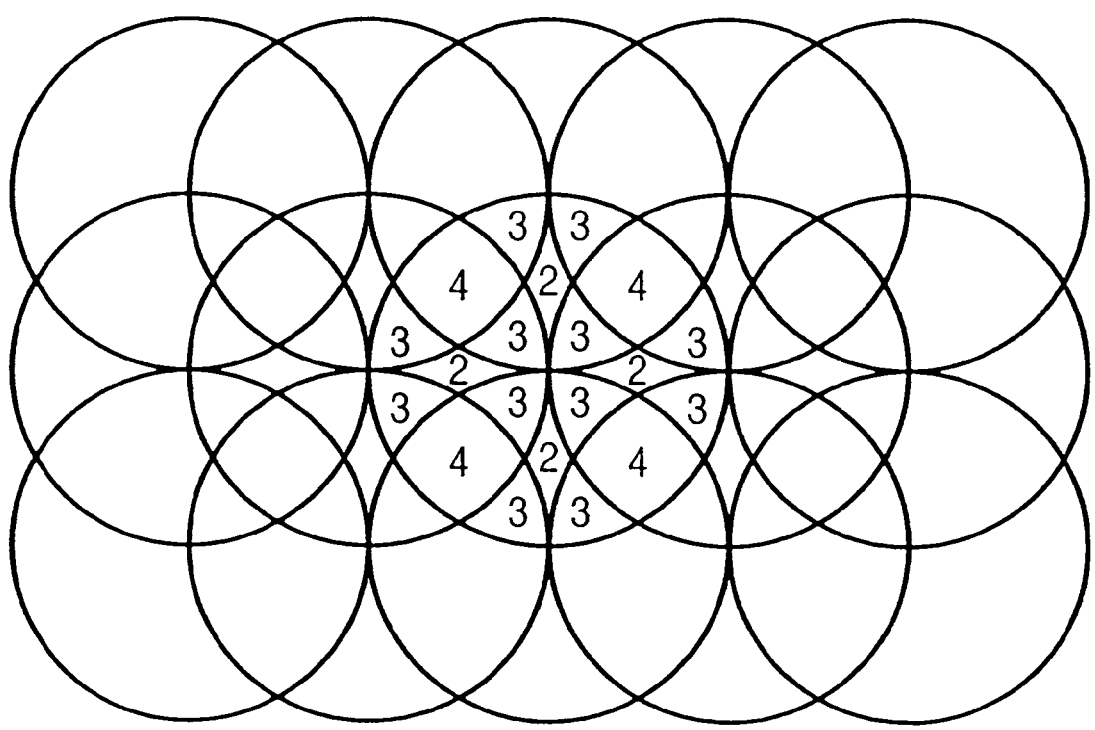
FIG. 9 shows a diagram of the rectangular placement of antenna units for minimal coverage by two antennas.
Figure 10:
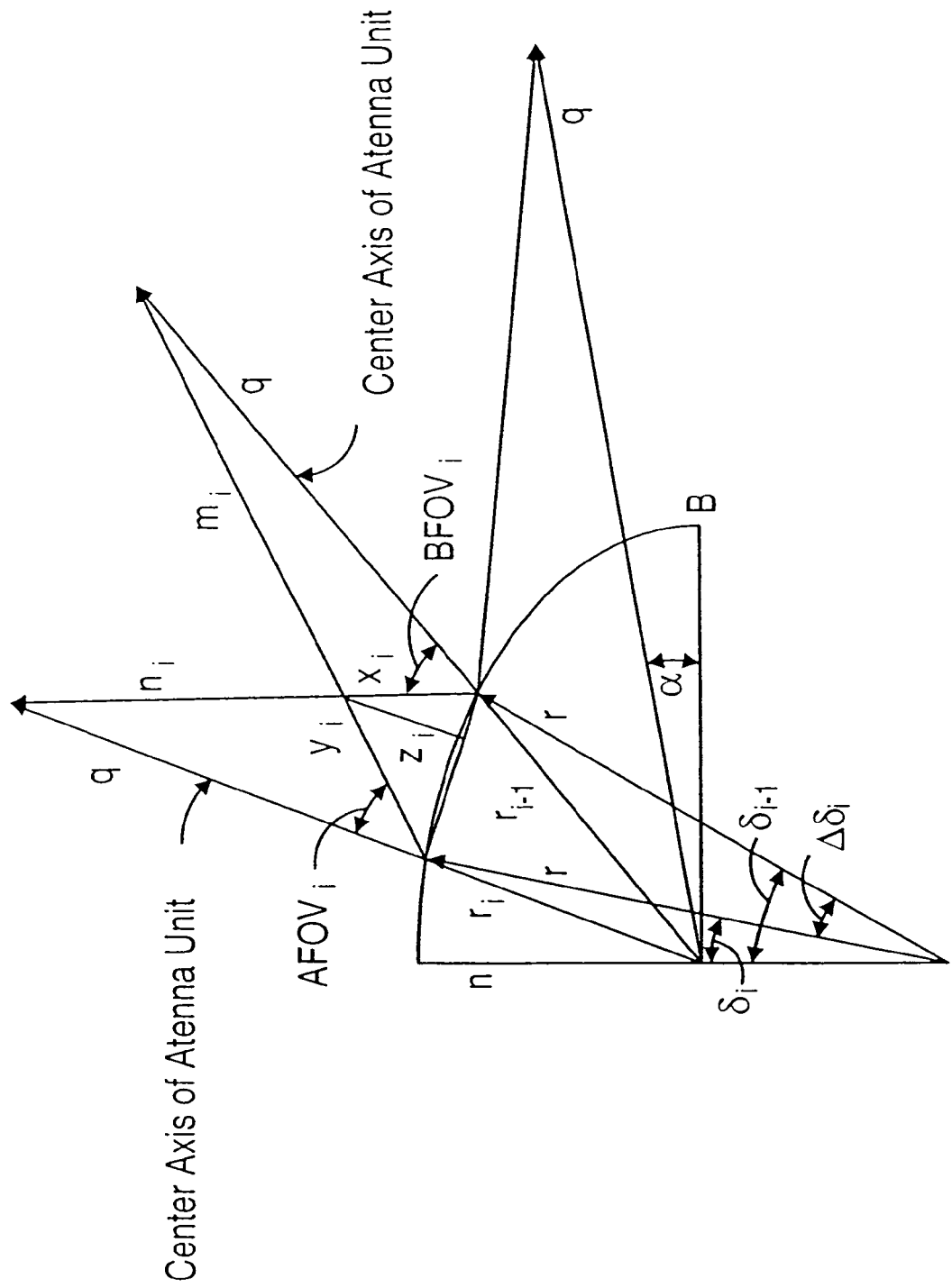
FIG. 10 shows additional details of the diagram shown in FIG. 8.

FIGS. 8-10 illustrate the analysis of the geometric configuration of the antenna elements 22 and partitioning device 20 in accordance with a preferred embodiment of the invention. FIG. 8 shows the geometry for the antenna array 21 based on a spherical design. Other geometries may be used since this example is for illustration purposes to show some of the basic analysis and equations for the design of the antenna array 21. The design in FIG. 8 starts out with a sphere 70. Chord AB 72 defines the base plate of an antenna array. The distance n 74 is defined as the distance from the arc of the circle to the chord AB 72. The length of chord AB 72 is b. Together n and b define the dimensions of the antenna array and the radius of the sphere 70. In particular, the radius, r 76, is defined from b and n by the following equation.

$$r = \frac{b^2 + 4n^2}{8n} \quad (1)$$

The configuration for the individual antenna units, i.e., partitions, is then developed by first considering the sky coverage desired. For this example, the coverage involves each antenna unit covering about half the coverage of the adjacent antenna unit as seen from the side. This type of configuration gives two possible types of which only the rectangular coverage for minimum two antenna coverage is shown in FIG. 9. The numbers in FIG. 9 represent the numbers of antennas covering that area, hence the smallest number for an area is two. A planar arrangement is shown here for simplicity of illustration. The coverage can be optimized for different scenarios using irregular antenna unit placement, using different shapes, antenna units (L1, L2 or L5 GPS signals) and sizes, etc., instead of a one-size circular antenna reception pattern. The diameters of the circles in FIG. 9 represent the field-of-view as represented by an angle of a cone with the vertex located at virtually the center of the antenna unit.

A representation of two of many antenna units is shown in FIG. 10. The antenna elements are represented as point sources on the antenna array surface. This assumption is not a problem considering the large distances from the antenna array to the orbit of a GPS satellite, for example. The center axis for each antenna unit is shown. The purpose of FIG. 10 is to show the relationships necessary to determine the field-of-view (FOV) for each antenna unit and the necessary spacing between antenna units for a given $\Delta\delta_i$, which is the difference angle that is formed by the chord with the center of the spherical design. It is a parameter that is assigned to be common throughout all equations and is formed from two angles $\delta_i$, and $\delta_{i-1}$. The equation for the difference angle is:

$$\Delta\delta_i = \delta_{i-1} - \delta_i \qquad (2)$$

The distance, $r_i$ from the antenna array center to the surface, shown in FIG. 10 for each antenna unit is given as:

$$r_i = \sqrt{r^2 + (r-n_i)^2 - 2r(r-n_i)\cos\delta_i} \qquad (3)$$

The constraint equations for maintaining the proper sky coverage are based upon the distance from an adjacent antenna to where the center axis of the antenna unit in question crosses the satellite orbit. These equations are given below as:

$$m_i = \sqrt{2r^2(1-\cos\Delta\delta_i) + q^2 + 2rq\sqrt{1-\cos\Delta\delta_i} \left[\frac{r_i^2 - r_{i-1}^2 - 2r^2(1-\cos\Delta\delta_i)}{-2r_{i-1}r\sqrt{2(1-\cos\Delta\delta_i)}}\right]} \qquad (4)$$

$$n_i = \sqrt{2r^2(1-\cos\Delta\delta_i) + q^2 + 2rq\sqrt{1-\cos\Delta\delta_i} \left[\frac{r_{i-1}^2 - r_i^2 - 2r^2(1-\cos\Delta\delta_i)}{-2r_i r\sqrt{2(1-\cos\Delta\delta_i)}}\right]} \qquad (5)$$

To find the field-of-view, the formula of a general triangle is used to relate the three sides of the triangle to one angle. Since two sides for the triangle containing the unknown angle $AFOV_i$ are known, only the third side is needed and can be found from the equations below for $y_i$. The solution to $y_i$ will be iterative due to the transcendental nature of these equations.

$$y_i = \left[\left[\sqrt{2r^2(1-\cos\Delta\delta_i)}\right]\left[\frac{-2n_i\sqrt{2r^2(1-\cos\Delta\delta_i)}}{q^2 - n_i^2 - 2r^2(1-\cos\Delta\delta_i)}\right] - \left[\sqrt{\frac{y_i^2 + 2r^2(1-\cos\Delta\delta_i) - 2y_i\sqrt{2r^2(1-\cos\Delta\delta_i)}}{-2n_i\sqrt{2r^2(1-\cos\Delta\delta_i)}}}\right] * \left[\frac{q^2 - m_i^2 - 2r^2(1-\cos\Delta\delta_i)}{-2m_i\sqrt{2r^2(1-\cos\Delta\delta_i)}}\right]\left[\frac{-2n_i\sqrt{2r^2(1-\cos\Delta\delta_i)}}{q^2 - n_i^2 - 2r^2(1-\cos\Delta\delta_i)}\right]\right] \qquad (6)$$

An approximate solution for $y_i$ for $q \approx m_i \approx n_i \gg r^2$ is:

$$y_i \approx 2n_i - \sqrt{y_i^2 + 2r^2(1-\cos\Delta\delta_i)\left(1 - \frac{y_i}{n_i}\right)} \qquad (7)$$

The equation for $AFOV_i$ is:

$$AFOV_i = \cos^{-1}\left[\frac{(n_i - x_i)^2 - q^2 - y_i^2}{-2qy_i}\right] \qquad (8)$$

The field-of-view $BFOV_i$ is found similarly as $AFOV_i$. First the third side is found as $$x_i = \sqrt{\frac{y_i^2 + 2r^2(1-\cos\Delta\delta_i) - 2y_i\sqrt{2r^2(1-\cos\Delta\delta_i)}}{\frac{q^2 - n_i^2 - 2r^2(1-\cos\Delta\delta_i)}{-2n_i\sqrt{2r^2(1-\cos\Delta\delta_i)}}}} \qquad (9)$$

An approximate solution for $x_i$ for $q \approx n_i \gg r^2$ is $$x_i \approx \sqrt{y_i^2 + 2r^2(1-\cos\Delta\delta_i) - \frac{2y_i r^2(1-\cos\Delta\delta_i)}{n_i}} \qquad (10)$$

The equation for $BFOV_i$ is $$BFOV_i = \cos^{-1}\left[\frac{(m_i - y_i)^2 - q^2 - x_i^2}{-2qx_i}\right] \qquad (11)$$

The passive anti-jamming antenna system of the present invention may be implemented using little or no software. The multiple antenna elements may be controlled by simple software logic, which controls the attenuation of the signal if the power exceeds a threshold. Power sensitive RF filters or power reactive RF lenses or composites may also be used to evaluate and attenuate the signal in each sector. For example, two or more layers of orthogonally polarized materials may be employed that permit target frequencies below an application-specific power threshold to pass through, but attenuate target frequencies upon detection that the threshold is exceeded. The layers may also have hysteresis properties with respect to signal attenuation and transfer sufficient to meet protected system requirements.

Furthermore, an outer protective skin may be provided that is composed of a material that protects the antenna system or provides aerodynamic qualities. This skin may also serve as a band-pass filter, limiting the frequencies passing through to the subtending cell to a band-width that includes the targeted frequency. Alternatively, an inner structure of RF directive lenses may be employed which have the following characteristics: they partition the RF environment; are coated or otherwise designed to prevent RF reflections and multipath receptions; permit target frequencies below application-specific power threshold to pass through; and attenuate target frequencies upon detection that the threshold is exceeded through reflection (directing excess power away from the protected antenna receiver element).

Numerous other modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the structure and method may be varied substantially without departing from the spirit of the invention and the exclusive use of all the modifications, which come within the scope of the appended claims, is reserved.

We claim:

1. In an environment comprising a plurality of sources of electromagnetic energy, an antenna system comprising:
   a plurality of receiving antenna elements;
   a partitioning structure:
      positioned between the elements and the sources,
      disposed to create at least two non-identical radio frequency fields of view; and
   at least one absorber substantially lining at least wall of the partitioning structure.

2. The antenna system according to claim 1, further comprising:
   a processing unit:
      in electrical communication with at least two antenna elements;
      operative to receive the electrical signal of each communicated antenna element;
      operative to characterize the electrical signal of each communicated antenna element; and
      operative to modify those electrical signals for which the characterization meets a condition.

3. The antenna system according to claim 2, wherein the characterization of the electrical signal of each communicated antenna element comprises a function of the power such electrical signal.

4. The antenna system according to claim 3, wherein the condition for modification is that the function of the power of the characterized electrical signal exceeds a threshold.

5. The antenna system according to claim 4, wherein the modification of those electrical signals for which power is greater than a threshold is attenuation.

6. The antenna system according to claim 5, wherein the modification of those electrical signals for which power is greater than a threshold is blocking.

7. The antenna system according to claim 2, further comprising, a combiner:
   in electrical communication with at the processing unit; and
   operative to receive at least two electrical signals from the processing unit and combine the signals.

8. The antenna system according to claim 1, further comprising an outer skin substantially covering at least a portion of the partitioning structure.

9. The antenna system according to claim 8, wherein the outer skin is a bandpass filter.

10. The antenna system according to claim 1, wherein the partitioning structure comprises a plurality of hex-shaped walls.

11. In an antenna system comprising a plurality of antenna elements, a method for improving the resistance of the antenna system to interference from electromagnetic energy sources, the method comprising:
    physically partitioning, using a partitioning structure, the space between the receiving antenna array and the electromagnetic energy sources such that at least two antenna elements are characterized by nonidentical radio frequency fields of view; and
    substantially coating at least one surface of the partitioning structure with an absorber.

12. The method according to claim 11, further comprising:
    in response to electromagnetic energy incident on the antenna array, determining which array elements contain energy characteristic of interference; and
    modifying the signal from at least one array element that contains energy characteristic of interference.

13. The method according to claim 12, wherein the step of modification comprises broadband attenuation of the signal from at least one antenna element that contains energy characteristic of interference.

14. The method according to claim 12, wherein the step of modification comprises blocking the electromagnetic energy from at least one antenna element that contains energy characteristic of interference.

* * * * *

UNITED STATES PATENT AND TRADEMARK OFFICE
CERTIFICATE OF CORRECTION

PATENT NO. : 7,324,064 B2
APPLICATION NO. : 11/242927
DATED : January 29, 2008
INVENTOR(S) : Cordell Fox et al.

Page 1 of 1

It is certified that error appears in the above-identified patent and that said Letters Patent is hereby corrected as shown below:

In Column 9, Line 19, please change "at least one absorber substantially lining at least wall of" to -- at least one absorber substsantially lining at least one wall of --

Signed and Sealed this

Twentieth Day of May, 2008

JON W. DUDAS
*Director of the United States Patent and Trademark Office*